(12) United States Patent
Julka et al.

(10) Patent No.: US 7,606,197 B2
(45) Date of Patent: Oct. 20, 2009

(54) EVENT NOTIFICATION IN A HYBRID NETWORK

(75) Inventors: Vibhor Julka, San Diego, CA (US); Erik Colban, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 412 days.

(21) Appl. No.: 11/094,951

(22) Filed: Mar. 31, 2005

(65) Prior Publication Data

US 2006/0062207 A1    Mar. 23, 2006

Related U.S. Application Data

(60) Provisional application No. 60/603,694, filed on Aug. 23, 2004, provisional application No. 60/652,585, filed on Feb. 14, 2005.

(51) Int. Cl.
H04W 4/00 (2006.01)
H04M 1/00 (2006.01)

(52) U.S. Cl. .................. 370/331; 370/352; 370/353; 370/354; 370/310; 370/310.2; 455/552.1; 455/432.1; 455/436; 455/442

(58) Field of Classification Search ............... 370/352, 370/355, 356, 338, 328; 455/453, 412.2, 455/552.1, 436, 437, 442
See application file for complete search history.

(56) References Cited

U.S. PATENT DOCUMENTS

| | | | | |
|---|---|---|---|---|
| 7,068,644 B1 * | 6/2006 | McConnell et al. | ......... | 370/352 |
| 7,151,770 B1 * | 12/2006 | Clark | ......... | 370/352 |
| 7,212,810 B2 * | 5/2007 | Babbar et al. | ......... | 455/414.1 |
| 7,551,586 B1 * | 6/2009 | Yew et al. | ......... | 370/332 |
| 2002/0111169 A1 * | 8/2002 | Vanghi | ......... | 455/436 |
| 2003/0152049 A1 * | 8/2003 | Turner | ......... | 370/331 |
| 2004/0120283 A1 * | 6/2004 | Rezaiifar et al. | ......... | 370/328 |
| 2004/0157610 A1 * | 8/2004 | Black et al. | ......... | 455/443 |
| 2005/0009542 A1 * | 1/2005 | Oprescu-Surcobe et al. | | 455/466 |
| 2005/0083888 A1 * | 4/2005 | Smee et al. | ......... | 370/332 |

* cited by examiner

Primary Examiner—Huy Q Phan
(74) Attorney, Agent, or Firm—Coats & Bennett, P.L.L.C.

(57) ABSTRACT

When a mobile station requests circuit services notifications through a packet switched network, a mobile switching center sets a forwarding indicator. When the MSC detects an event indicative of a change in the status of the mobile station, the MSC sends an event notification to the packet switched network if the forwarding indicator is set to true. In the packet switched network, the base station can use the event notifications to manage communication resources used for packet data communications with the mobile station.

19 Claims, 6 Drawing Sheets

EVENT NOTIFICATION IN A HYBRID NETWORK

RELATED APPLICATIONS

This application claims priority to Provisional U.S. Patent Application 60/603,694 filed Aug. 23, 2004, and to Provisional U.S. Patent Application 60/652,585 filed Feb. 14, 2005, which are incorporated herein by reference.

BACKGROUND OF THE INVENTION

The present invention relates generally to the operation of mobile stations in a hybrid wireless communication network, and more particularly, to an event notification procedure to make more efficient use of network resources.

Cellular networks were originally developed to provide primarily voice services over circuit switched networks. The introduction of packet switched 2.5G and 3G networks enables network operators to provide data services as well as voice services. Eventually, network architecture is expected to evolve toward all-IP networks providing both voice and data services. However, network operators have a substantial investment in existing infrastructure and would therefore prefer to migrate gradually to an all-IP network architecture to allow them to continue to use their existing infrastructure. At the same time, network operators recognize that there is a demand for high rate packet-data services. In order to provide high-rate packet data services, network operators may deploy hybrid networks wherein a high data rate (HDR) network is overlaid on an existing circuit switched or packet switched network as a first step in the transition to an all IP-based network.

A hybrid network that combines two or more networks with different signaling protocols and different air interfaces complicates signaling and session management. One example of a hybrid network combines an IS2000 radio access network providing voice and packet data services with a data only network, such as an IS-856-A High Rate Packet Data (HRPD) access network, providing high rate packet data services. A mobile station with an active packet data session in the HRPD access network may need to switch to the IS2000 network to perform some task, such as answer a voice call. The mobile station may stop listening to the base station in the HRPD access network and, under current standards, is not required to inform the HRPD access network. After switching from the packet switched network to the circuit switched network, the mobile station could power down without returning to the packet switched network. In either scenario, the HRPD access network may assume that the mobile station is still present and listening, or that it may return, and consequently reserve resources to serve the no longer present mobile station. If the HRPD access network receives incoming packet data for the mobile station, the HRPD access network may attempt to deliver the data to the mobile station, which is no longer present. The attempt to deliver the packet data will fail and the HRPD access network will eventually deduce that the mobile station is no longer listening. At that point, the HRPD access network will release resources and update the packet data serving node for accounting purposes. The packet switched network may send a request to a Mobile Switching Center (MSC) to page the mobile station in the IS2000 network before releasing resources. If the mobile station has powered down, the attempts to page the mobile station will be futile and will unnecessarily consume network resources.

SUMMARY OF THE INVENTION

The present invention provides a method of managing a communication session with a mobile station in a hybrid network including a circuit switched network and a packet switched network. While operating in the packet switched network, the mobile station may request circuit services notifications through the packet data network. A mobile switching center (MSC) in the circuit switched network stores an indication that the mobile station is operating within the packet switched network and sends circuit services notifications to the mobile station via the packet switched network. According to various embodiments of the present invention, the MSC sends event notifications to the packet switched network responsive to predetermined events, such as a presence event or a power down event, indicating a change in the status of the mobile station. The packet switched network uses the event notifications to better manage network resources.

One event that may trigger the event notification procedure is the presence event. A presence event is an event that indicates that the mobile station is present in the network. A mobile station operating in the packet switched network may receive a circuit services notification, such as a page message, from the circuit services notification application (CSNA). In this case, the mobile station may switch to a carrier in the circuit switched network and send a page response or other message. When the MSC detects the mobile station in the circuit switched network and the mobile station has requested forwarding of circuit services notifications via the packet switched network, the mobile switching center sends an event notification message to the packet switched network indicating that the mobile station has been detected. If resources had been reserved for the mobile station, for example, to support an active packet data call, the packet switched network can release those resources, making them available for others to use. Further, the packet switched network may send an accounting update to a packet data serving node to update the accounting. Thus, the present invention facilitates early release of communication resources, which will increase system throughput and, therefore, system capacity.

Another event that may be useful to report is the power down event. After switching from the packet switched network to the circuit switched network, the mobile station may power down without returning to the packet switched network. The packet switched network may continue to reserve resources, such as A10 connections, and store information for the mobile station in the event that the mobile station returns to the packet switched network. In this scenario, the MSC may send an event notification to the packet switched network to notify the packet switched network that the mobile station has powered down. The packet switched network can then release any resources reserved for the mobile station, such as A10 connections.

DETAILED DESCRIPTION OF THE INVENTION

Figure 1:
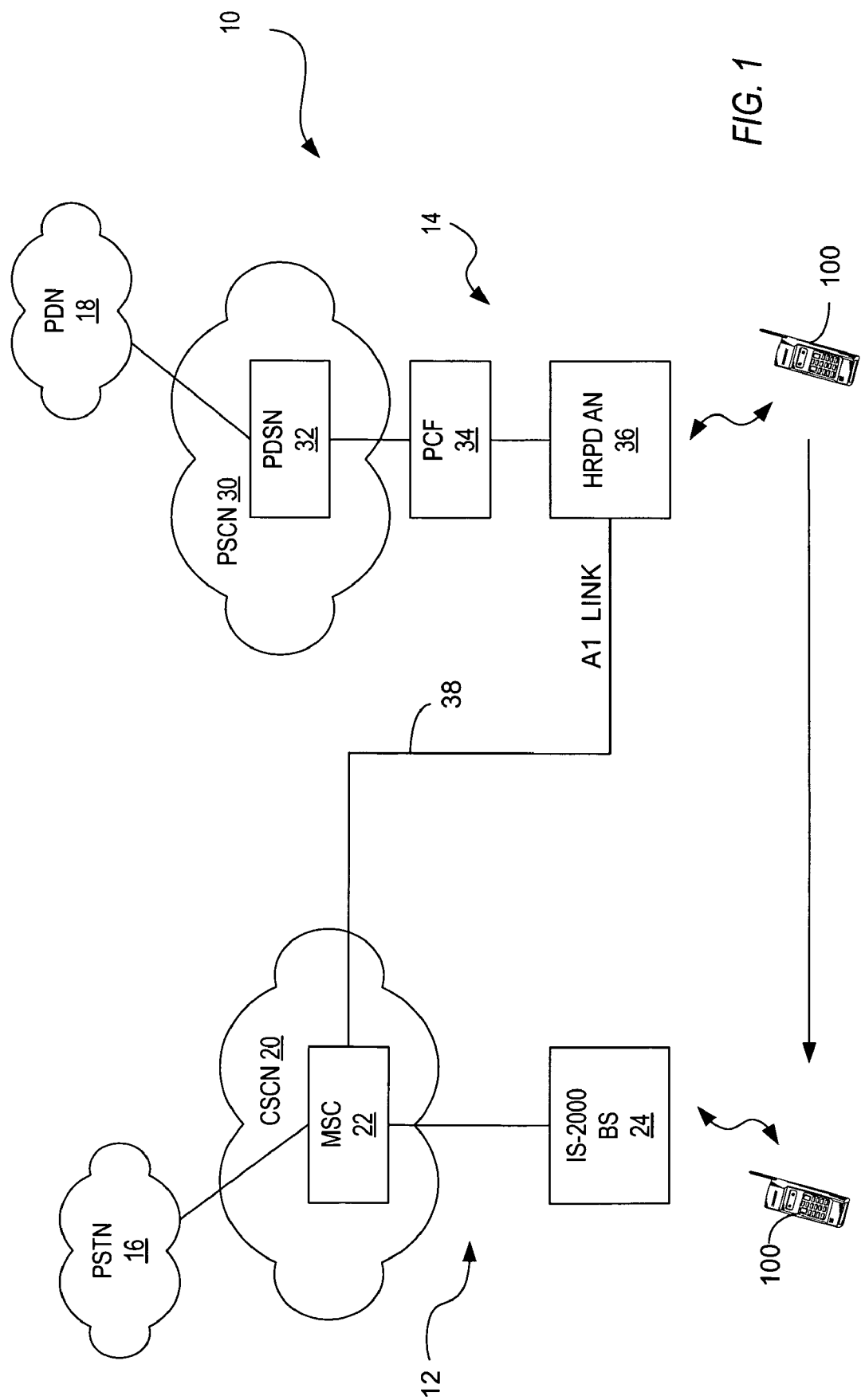
FIG. 1 is a block diagram of a hybrid network according to the present invention.

Referring now to the drawings, the present invention will be described in the context of a hybrid network 10 providing both voice and data services to mobile stations 100. In the exemplary embodiment shown herein, the hybrid network 10 comprises a combined network incorporating both an IS2000 radio access network (IS2000 RAN) 12 and an HRPD access network (IS856-A) 14. The exemplary embodiment is intended to be illustrative only and those skilled in the art will appreciate that the present invention may be used in networks based on other network standards.

The IS2000 RAN 12 comprises one or more base stations 24 connected to a circuit switched core network (CSCN) 20. The CSCN 20 provides primarily voice services and low rate data services, such as facsimile services, to the mobile stations 100. The CSCN 20 includes a mobile switching center (MSC) 22 that provides a connection to the public switched telephone network (PSTN) 16. The MSC 22 routes traffic between the PSTN 16 and the base stations 24. The base stations 24 communicate with the mobile stations 100 over the air interface. The base stations 24 forward downlink traffic and signaling from the MSC 22 to the mobile stations 100, and forward uplink traffic and signaling from the mobile stations 100 to the MSC 22. In some embodiments, the IS2000 may also provide packet-switched services, though this capability is not material to the present invention and is not discussed further herein.

Also shown in FIG. 1 is an HRPD RAN 14. The HRPD RAN 14 is a high data rate (HDR) network and may be combined with an IS2000 network to provide high speed packet data services. The IS856 standard is generally known as 1xEV-DO. The HRPD RAN 14 comprises one or more access networks (ANs) 36 for communicating with the mobile stations 100, and a packet core function (PCF) 34 connecting the HRPD AN 36 to a packet switched core network (PSCN) 30. The PSCN 30 includes a PDSN 32 that connects to a packet data network 18, such as the Internet. The PDSN 32 establishes communication sessions with mobile stations 100 using, for example, the point-to-point protocol (PPP). The HRPD AN 36 forwards mobile terminated packet data from the PDSN 32 to the mobile stations 100, and forwards mobile-originated packet data to the PDSN 32.

When a mobile station 100 is operating within the IS856 network 14, the mobile station 100 may still want to receive notifications from the MSC 22 relating to circuit switched services without having to periodically return to the IS2000 RAN 12 to receive such notifications. For example, mobile station 100 may want to receive paging messages over the IS856 air interface alerting the mobile station 100 to incoming voice calls. To that end, the HRPD AN 36 includes a 3G1x Circuit Services Notification Application (CSNA) 42, which may be seen in FIG. 3. Alternatively, the CSNA 42 could be located in the PCF 34. The CSNA 42 provides circuit services notifications to mobile stations 100 over the IS856-A air interface. The CSNA 42 uses the Circuit Services Notification (CSN) protocol. The CSN protocol also ensures that the mobile station 100 stays registered with the CSCN 20 even when it is monitoring the IS856 packet data channel. The CSNA 42 is described in *cdma2000 High Rate packet Data Air Interface Specification,* 3GPP2 C.20024-A, Version 1.0 (March 2004), which is incorporated herein by reference. The mobile station 100 may request circuit services notifications from the HRPD RAN 14, causing the CSNA 42 to notify the MSC 22 to send notification messages to the mobile station 100 via the HRPD RAN 14. The CSNA 42 and mobile station 100 may configure a filter that allows notifications associated with only certain circuit switched services to be sent over the IS856 air interface.

When the mobile station 100 requests circuit services notifications from the IS856 network, the MSC 22 will be informed that the mobile station 100 has requested CSNA services and will send circuit services notifications to the mobile station 100 via the HRPD AN 36. The CSNA 42 in the HRPD AN 36 receives the circuit services messages from the MSC 22, and the CSNA 42 in turn provides circuit service notifications to the mobile station 100.

In some scenarios, the circuit services notification sent to the mobile station 100 may cause the mobile station 100 to transition to the IS2000 RAN 12. As one example, the CSNA 42 may receive a paging request message from the MSC 22 and send a page message to the mobile station 100 responsive to the paging request message causing the mobile station 100 to transition to the IS2000 RAN 12 to receive a voice call. In other scenarios, the mobile station 100 may autonomously transition to the IS2000 RAN 12. For example, the mobile station 100 may transition to the IS2000 RAN 12 to originate a voice call.

Under the current IS856 standards, the mobile station 100 is not required to notify the HRPD AN 36 when it transitions to the IS2000 RAN 12. If the mobile station 100 is engaged in an active packet data session, the HRPD AN 36 will continue to reserve radio resources for the active packet data session with the mobile station 100. The PDSN 32 will forward packet data to the HRPD AN 36, which will attempt to deliver the packet data to the mobile station 100. The HRPD AN 36, through the use of internal mechanisms such as inactivity timers, failed delivery attempts, etc., will eventually determine that the mobile station 100 is not longer listening on the IS856 carriers and will release the radio and communication resources that have been reserved for the mobile station 100. The HRPD AN 36 may request the MSC to page the mobile station in the IS2000 RAN 12 and wait for a response from the mobile station 100 before releasing resources.

When the mobile station 100 transitions from the HRPD RAN 14 to the IS2000 RAN 12, the radio and communications resources reserved for the mobile station 100 are not being used. Releasing reserved radio and communication resources as early as possible would improve overall throughput of the network, and therefore, increase system capacity. Further, releasing resources when the mobile station 100 transitions to the IS2000 network can reduce accounting discrepancies.

According to the present invention, a method is provided for sending event notifications between the IS2000 RAN 12 and the HRPD RAN 14 to more efficiently manage resources. When the mobile station 100 registers with the HRPD RAN 14, it may request forwarding of circuit services notifications through the HRPD RAN 14. When the HRPD AN 36 receives a request for circuit services notifications via the HRPD RAN 14, it notifies the MSC 22 via an A1 signaling link 38 that the mobile station 100 is operating within the IS 856 RAN 14.

The MSC 22 stores an indication, referred to herein as the forwarding flag, indicating that the mobile station 100 is operating within the HRPD RAN 14. This flag indicates that circuit services notifications should be forwarded to the mobile station 100 through the HRPD RAN 14. The forwarding flag is also used to determine when event notifications should be sent by the MSC 22 to the HRPD RAN 14. When the forwarding flag is set, the MSC 22 sends event notifications to the HRPD RAN 14 responsive to certain predetermined events.

One event that may trigger an event notification is a presence event. A presence event occurs when the IS2000 RAN 12 detects the mobile station 100 after the mobile station 100 has transitioned from the HRPD RAN 14. When the MSC 22 detects the presence of a mobile station 100 after it has transitioned to the IS2000 RAN 12, the MSC 22 sends an event notification to the HRPD RAN 14. This situation may occur for example when the mobile station 100 involved in an active packet data session in the HRPD RAN 14 receives a circuit services notification, such as a page message. Responsive to the page message or other circuit services notification, the mobile station 100 transitions to the IS2000 RAN 12. The mobile station 100 could also transition to the IS2000 RAN 12 on its own initiative, for example, to initiate a voice call. When the MSC 22 detects that the mobile station 100 has transitioned to the IS2000 RAN 12 and the forwarding flag is set, the MSC 22 sends an event notification message to the HRPD RAN 14 to notify the HRPD RAN 14 of the presence event. Upon receipt of the notification message from the MSC 22, the HRPD RAN 14 can release resources reserved for the mobile station 100 and send an accounting update to the PDSN 32 to update accounting. In one exemplary embodiment, the HRPD RAN 14 places the packet data session in a dormant state responsive to the event notification. Thus, the HRPD RAN 14 may tear down its A8 connection and release any air interface resources reserved for the mobile station while maintaining the A10 connection to the PDSN 32.

Another event that may trigger an event notification is referred to herein as the power down event. If the mobile station 100 powers down after transitioning to the IS2000 RAN 12, the MSC 22 may send an event notification to the HRPD RAN 14 to notify that the mobile station 100 is no longer reachable. In response to the power down event notification, the HRPD RAN 14 terminates the packet data session and tear down the A10 connection to the PDSN 32. Similarly, the HRPD RAN 14 may send an event notification to the IS2000 RAN 12 when the mobile station 100 powers down while present in the HRPD RAN 14.

Figure 2:
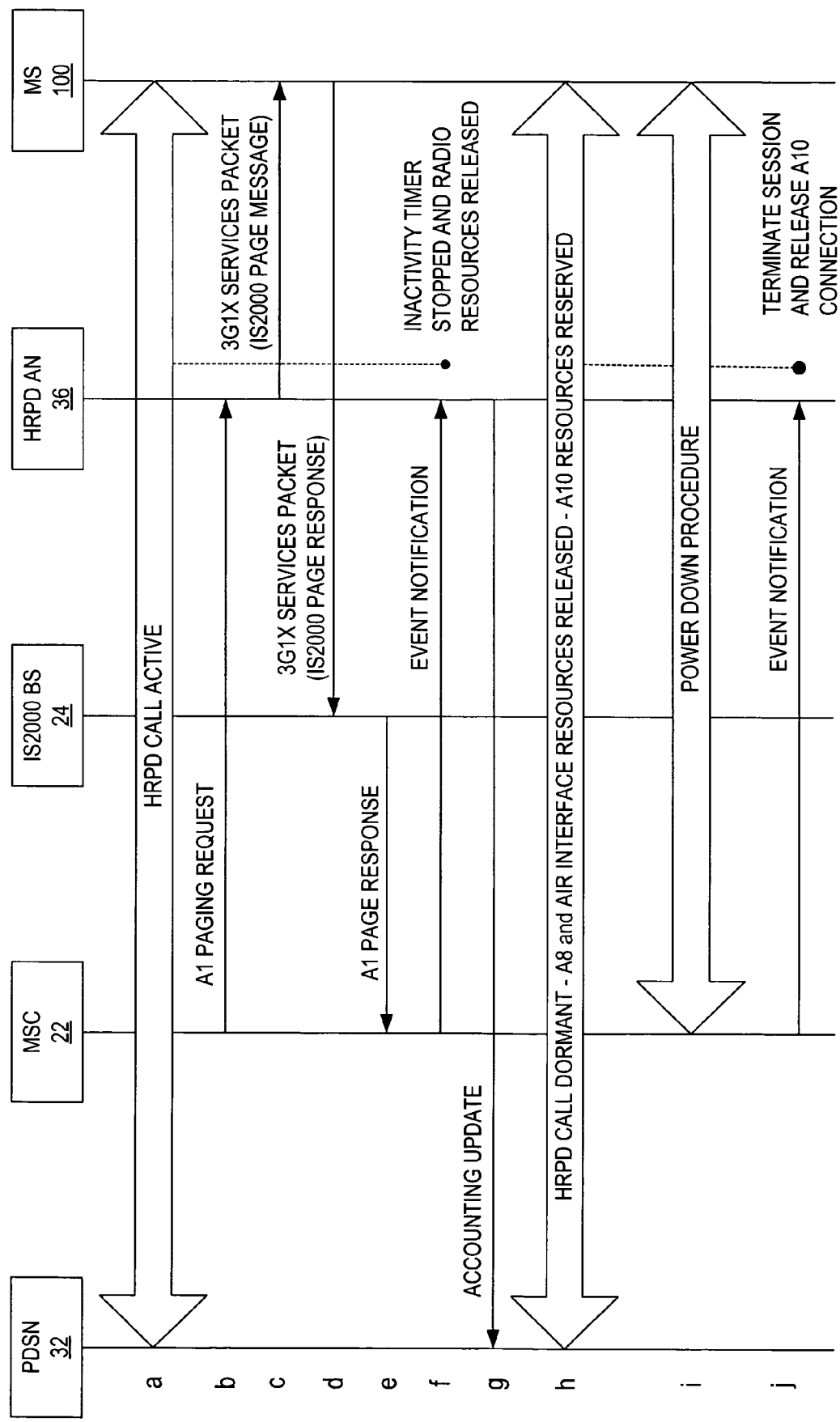
FIG. 2 is a call flow diagram illustrating an exemplary scenario using the event notification procedure according to the present invention.

FIG. 2 is a call flow diagram illustrating how event notifications may be used. The call flow diagram is meant to be illustrative. Those skilled in the art will recognize that the present invention may be implemented in other procedures. The mobile station 100 establishes an active packet data call with the HRPD RAN 14 (step a). It is assumed that the mobile station 100 has requested CSNA services and that the MSC 22 has set the forwarding flag as previously described. While the mobile station 100 is involved in an active packet data call, the MSC 22 sends an A1 paging request to the HRPD AN 36 (step b), and the HRPD AN 36 sends an IS2000 page message to the mobile station 100 encapsulated within a IS856-A air interface message (step c). The mobile station 100 transitions to the IS2000 RAN 12 and sends an IS2000 page response encapsulated within a IS856-A air interface message (step d). The IS2000 BS 24 receives the page response from the mobile station 100, reformats the page response, and sends an A1 paging response to the MSC 22 (step e). The MSC 22 sends an event notification to the HRPD AN 36 indicating that the mobile station 100 has been detected in the IS2000 RAN 12 (step f). The HRPD RAN 14 stops its inactivity timer and releases radio and communication resources assigned to the mobile station 100. The HRPD AN 36 also sends an accounting update to the PDSN 32 to update accounting for the packet data call (step g). At this point, the packet data call goes into a dormant state (step h). In the dormant state, the HRPD RAN 14 maintains a connection with the PDSN 32 for the packet data call but there is no communication channel established between the HRPD RAN 14 and the mobile station 100. As is well known to those skilled in the art, the communication channel for the packet data call can be re-established at the initiative of either the HRPD RAN 14 or the mobile station 100. Procedures for re-establishing the packet data calls are not material to the present invention.

The mobile station 100 powers down without returning to the HRPD RAN 14. Before shutting down, the mobile station 100 and MSC 22 execute a power down procedure (step i). In one exemplary procedure, the mobile station 100 sends a power down indication to the IS2000 BS 24, which in turn sends a Clear Request message to the MSC 22 to initiate call clearing. The MSC 22 sends a Clear Command message to the IS2000 BS 24, which releases the resources allocated to the mobile station and sends a Clear Complete message with a power down indicator to the MSC 22. In response to the Clear Complete message, the MSC 22 sends an event notification to the HRPD RAN 14 (step j) and the HRPD RAN 14 terminates the packet data session and releases the A10 connection to the PDSN 32.

Figure 3:
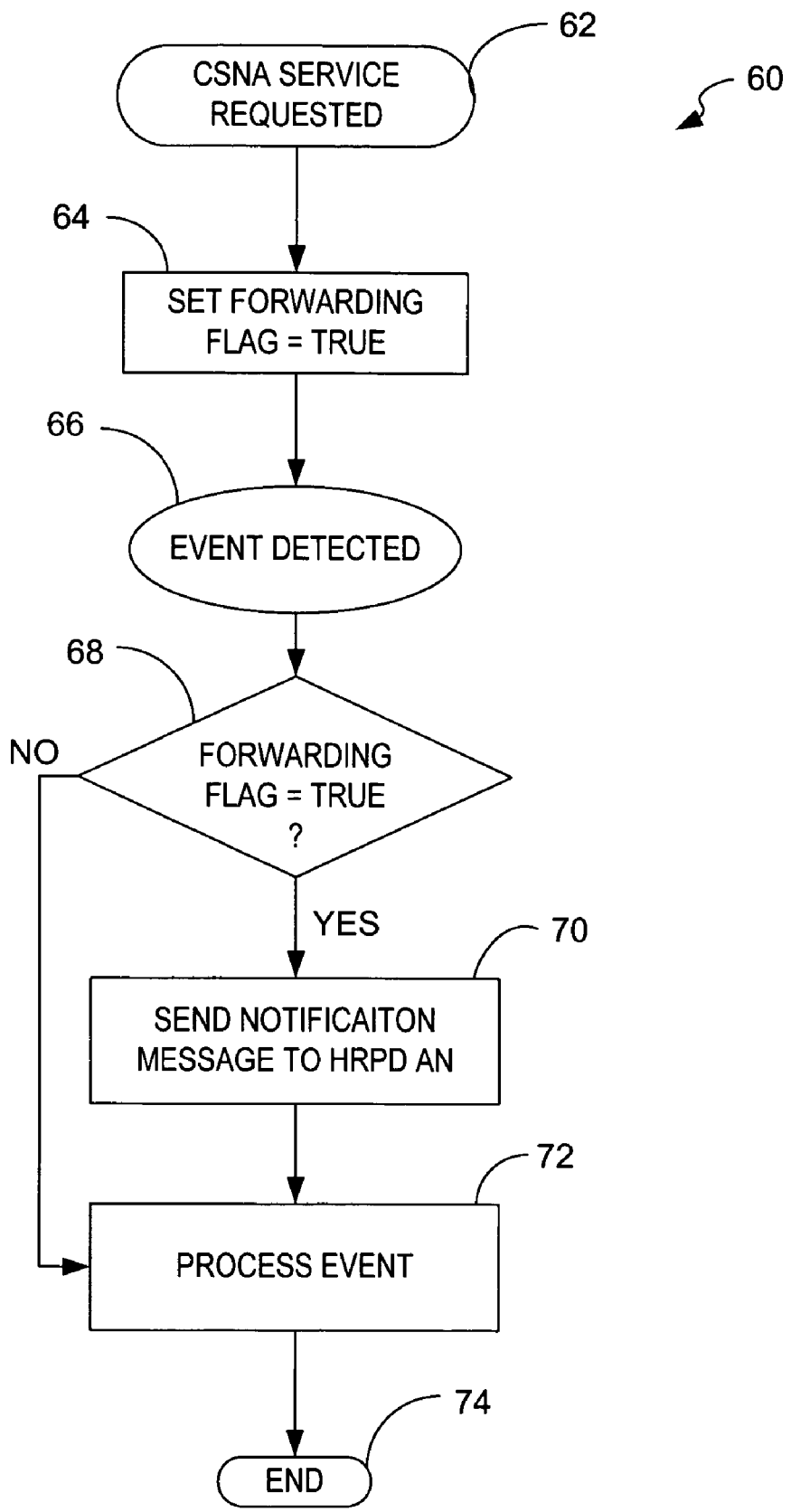
FIG. 3 is a flow chart illustrating a procedure executed by the MSC to implement the session management procedure of the present invention.

FIG. 3 is a flow diagram illustrating an exemplary notification procedure 60 implemented by the MSC 22. The procedure 60 begins when the MSC 22 receives a request from the HRPD RAN 14 to send circuit services notifications to the mobile station 100 via the HRPD AN 36 (block 62). The MSC 22 sets a forwarding flag to true (block 64). When the MSC 22 subsequently detects an event (block 66), it determines the setting of the forwarding flag (block 68). The detected event may, for example comprises a presence event, power down event, or some other event. If the forwarding flag is set to true, the MSC 22 sends the HRPD RAN 14 an event notification (block 70). The event notification includes an indication of the type of the event. The MSC 22 responds to the event normally as specified in applicable standards (block 72) and the process ends (block 74). If the forwarding flag is set to false (block 68), the MSC 22 processes the received message from the mobile station 100 normally (block 72).

Figure 4:
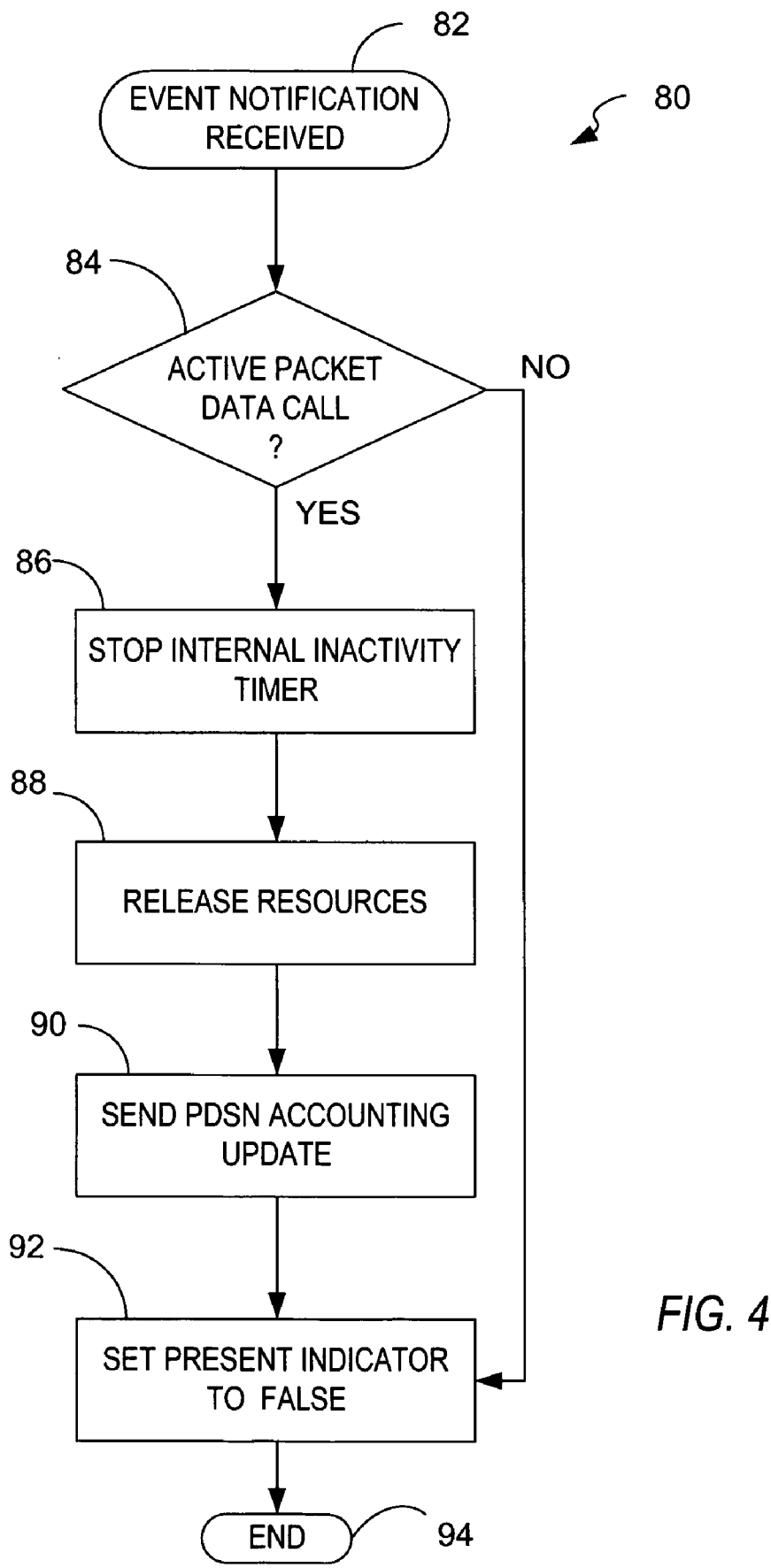
FIG. 4 is a flow chart illustrating a procedure implemented by an HRPD access network to implement the session management procedure according to the present invention.

FIG. 4 illustrates an exemplary resource management procedure 80 implemented by an HRPD RAN 14 for responding to a presence event. It is assumed that the mobile station 100 has requested CSNA services and that the presence flag at the HRPD AN 36 is set to true. The procedure begins when the HRPD AN 36 receives a notification that the mobile station 100 has been detected in the IS2000 RAN 12 (block 82). The HRPD AN 36 determines if a packet data call is active (block 84). If so, the HRPD AN 36 stops its internal inactivity timer (block 86) and releases resources assigned to the mobile station 100 (block 88). Additionally, the HRPD AN 36 sends an accounting update to the PDSN 32 (block 90) and sets a presence flag equal to false (block 92). The presence flag indicates whether the mobile station 100 is present and listening in the HRPD AN 36. The HRPD AN 36 can use the presence flag to determine if it should attempt delivery of packet data over the IS856 air interface, or send a request to the MSC 22 to page the mobile station 100. The HRPD AN 36 sets the presence flag to false (block 92) and the procedure ends (block 94).

Figure 5:
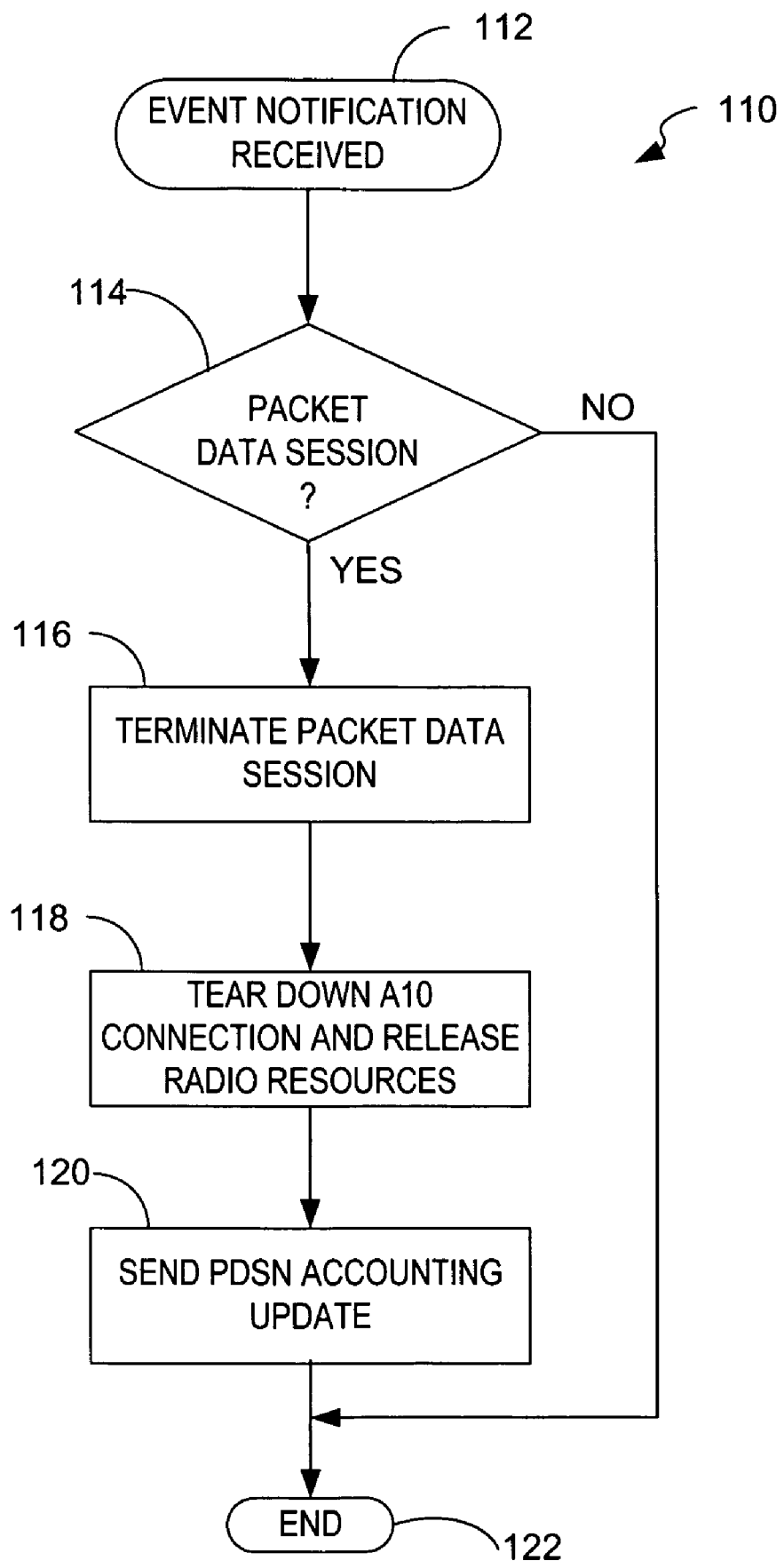
FIG. 5 is a flow chart illustrating another procedure implemented by an HRPD access network to implement the session management procedure according to the present invention.

FIG. 5 illustrates an exemplary procedure 110 implemented by the HRPD AN 36 for responding to a power down event. The procedure begins when the HRPD AN 36 receives an event notification from the MSC 22 indicating that the mobile station 100 has powered down (block 112). The HRPD AN 36 determines if a packet data call session exists (block 114). If so, the HRPD AN 36 terminates the packet data session (block 116), tears down the A10 connection to the PDSN 32, and releases radio resources (block 118). Additionally, the HRPD AN 36 may send an accounting update to the PDSN 32 (block 120) and the procedure ends (block 122).

Figure 6:
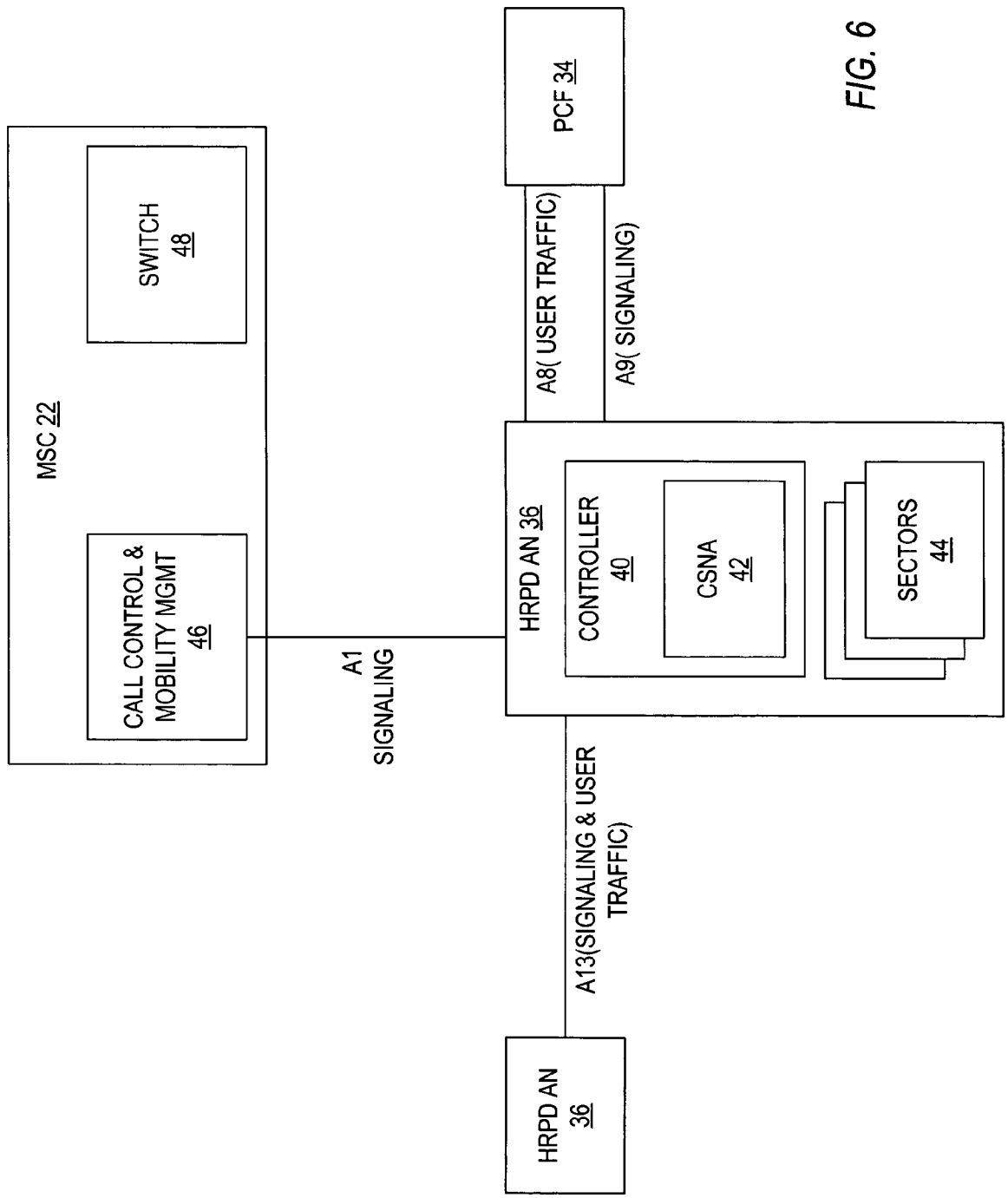
FIG. 6 is a block diagram illustrating exemplary details of a mobile switching center and HRPD access network.

FIG. 6 illustrates an exemplary MSC 22 and HRPD AN 36 in more detail. The MSC 22 includes a call control and mobility management circuit 46 for call control handling and mobility management functions, and a switch 48 for routing user traffic. The AN 36 includes a controller 40 and one or more sectors 44. The sectors 44 contain the radio equipment for communicating with the mobile stations 100. The controller 40 comprises the control portion of the AN 36. The controller 40 processes call control signaling and manages the radio and communication resources used by the sectors 44. The controller 40 includes the CSNA 42, which may be implemented in a processor programmed to carry out the functions of the CSNA 42. The CSNA 42 exchanges signaling with the MSC 22 and provides the circuit services notifications to mobile stations 100 over the IS856 air interface. Signaling traffic between the controller 40 and the MSC 22 is carried over the A1 interface. The A8 and A9 interfaces carry user traffic and signaling, respectively, between the HRPD AN 36 and PCF 34. The A13 interface transfers user traffic and signaling between HRPD ANs 36.

In any case, those skilled in the art should appreciate that the present invention is not limited by the foregoing discussion, nor by the accompanying figures. Rather, the present invention is limited only by the following claims and their reasonable legal equivalents.

What is claimed is:

1. An event notification method implemented in a hybrid network including a circuit switched network and a packet switched network, the method comprising:
   receiving an indication that a mobile station is operating in the packet switched network;
   detecting an event in the circuit switched network indicative of a change in the status of the mobile station;
   sending an event notification indicative of the status of the mobile station from the circuit switched network to the packet switched network responsive to said event.

2. The method of claim 1 wherein detecting an event comprises detecting the presence of said mobile station in the circuit switched network.

3. The method of claim 2 wherein detecting the presence of said mobile station in the circuit switched network comprises receiving a signaling message from said mobile station.

4. The method of claim 3 wherein the signaling message comprises a page response message.

5. The method of claim 3 wherein the signaling message comprises a location update message.

6. The method of claim 3 wherein the signaling message comprises an origination message.

7. The method of claim 1 wherein detecting an event comprises detecting that said mobile station has powered down.

8. The method of claim 1 wherein the indication that the mobile station is operating in the packet switched network is received from the packet switched network.

9. The method of claim 8 wherein the indication that the mobile station is operating in the packet switched network comprises a circuit services notification request.

10. The method of claim 1 wherein the packet switched network includes a circuit services notification application that receives the circuit service notifications from the circuit switched network and sends circuit services notifications to the mobile station.

11. A mobile switching center for a circuit switched network comprising:
    a signaling processor supporting call control and mobility management functions;
    said signaling processor configured to:
       receive an indication that a mobile station is operating in the packet switched network;
       detect an event in the circuit switched network indicative of a change in the status of the mobile station; and
       send an event notification from the circuit switched network to the packet switched network responsive to said event.

12. The mobile switching center of claim 11 wherein the signal processor detects an event by detecting the presence of said mobile station in the circuit switched network.

13. The mobile switching center of claim 12 wherein detecting the presence of said mobile station in the circuit switched network comprises receiving a signaling message from said mobile station.

14. The mobile switching center of claim 13 wherein the signaling message comprises a response to a page message.

15. The mobile switching center of claim 13 wherein the signaling message comprises a location update message.

16. The mobile switching center of claim 13 wherein the signaling message comprises an origination message.

17. The mobile switching center of claim 11 wherein the indication that the mobile station is operating in the packet switched network is received from the packet switched network.

18. The mobile switching center of claim 17 wherein the indication that the mobile station is operating in the packet switched network comprises a circuit services notification request.

19. The mobile switching center of claim 11 wherein the packet switched network includes a circuit services notification application that receives circuit service notifications from the circuit switched network and sends circuit services notifications to the mobile station.

* * * * *

UNITED STATES PATENT AND TRADEMARK OFFICE
CERTIFICATE OF CORRECTION

| | | |
|---|---|---|
| PATENT NO. | : 7,606,197 B2 | Page 1 of 1 |
| APPLICATION NO. | : 11/094951 | |
| DATED | : October 20, 2009 | |
| INVENTOR(S) | : Julka et al. | |

It is certified that error appears in the above-identified patent and that said Letters Patent is hereby corrected as shown below:

In Fig. 3, Sheet 3 of 6, for Tag "70", Line 1, delete "NOTIFICAITION" and insert -- NOTIFICATION --, therefor.

In Column 7, Line 16, delete "AN 36" and insert -- HRPD AN 36 --, therefor.

In Column 7, Line 19, delete "AN 36." and insert -- HRPD AN 36. --, therefor.

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO.       : 7,606,197 B2
APPLICATION NO. : 11/094951
DATED            : October 20, 2009
INVENTOR(S)      : Julka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 763 days.

Signed and Sealed this

Fifth Day of October, 2010

David J. Kappos
*Director of the United States Patent and Trademark Office*